(12) United States Patent
Irazabal

(10) Patent No.: US 12,174,827 B2
(45) Date of Patent: Dec. 24, 2024

(54) TRUSTLESS OPERATIONS FOR BLOCKCHAIN NETWORKS

(71) Applicant: International Business Machines Corporation, Armonk, NY (US)

(72) Inventor: Jeronimo Irazabal, Roque Perez (AR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/006,270

(22) Filed: Aug. 28, 2020

(65) Prior Publication Data

US 2022/0067028 A1 Mar. 3, 2022

(51) Int. Cl.
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
None
See application file for complete search history.

(56) References Cited

U.S. PATENT DOCUMENTS

| | | |
|---|---|---|
| 10,157,295 B2 | 12/2018 | Barinov et al. |
| 10,425,428 B2 | 9/2019 | Krishnamurthy |
| 10,567,168 B2 | 2/2020 | Garagiola et al. |
| 10,628,389 B2 | 4/2020 | Bordens |
| 11,182,379 B2* | 11/2021 | Yang ............... G06F 16/215 |
| 11,303,707 B1* | 4/2022 | Adler ............... H04L 67/125 |
| 11,334,925 B1* | 5/2022 | Todd ............. G06Q 30/0278 |
| 2019/0042620 A1* | 2/2019 | Garagiola ........... H04L 9/0637 |
| 2019/0042794 A1 | 2/2019 | Serret-Avila |
| 2019/0147106 A1 | 5/2019 | Androulaki et al. |
| 2019/0268162 A1* | 8/2019 | Sahagun ............. H04L 9/3236 |
| 2019/0278920 A1 | 9/2019 | Black et al. |
| 2019/0333169 A1* | 10/2019 | Povar ................. G06F 16/27 |
| 2019/0361867 A1* | 11/2019 | Nilsson ............. G06F 16/2255 |
| 2020/0103930 A1* | 4/2020 | Suresh ................. G06F 1/06 |
| 2020/0153605 A1* | 5/2020 | Hu |
| 2020/0250747 A1* | 8/2020 | Padmanabhan ......... G06N 5/04 |
| 2020/0278982 A1* | 9/2020 | Bowman ............... G06F 16/23 |
| 2021/0012326 A1* | 1/2021 | Maxwell Zelocchi ...... G06Q 20/3827 |
| 2021/0176043 A1* | 6/2021 | Taylor ............... G06F 16/2379 |

(Continued)

FOREIGN PATENT DOCUMENTS

| | | |
|---|---|---|
| CN | 109040029 A | 12/2018 |
| CN | 106022145 B | 7/2019 |

(Continued)

OTHER PUBLICATIONS

"Read-Write set semantics," Transaction simulation and read-write set, Hyperledger Fabric, Printed Jul. 14, 2020, 3 pages, https://hyperledger-fabric.readthedocs.io/en/latest/readwrite.html.

(Continued)

*Primary Examiner* — Hosain T Alam
*Assistant Examiner* — Cao D Vuong
(74) *Attorney, Agent, or Firm* — Jared C. Chaney

(57) ABSTRACT

A node in a blockchain network may receive an endorsed operation for a blockchain network, apply the operation; include a list comprising the operation in a subsequent block, and commit the subsequent block to a ledger of the blockchain network.

20 Claims, 13 Drawing Sheets

(56) References Cited

U.S. PATENT DOCUMENTS

2021/0248210 A1* 8/2021 Panikkar ............... G06F 21/105
2021/0303552 A1* 9/2021 Pandey ................. G06Q 10/10
2022/0005022 A1* 1/2022 Tu ......................... H04L 9/3239

FOREIGN PATENT DOCUMENTS

| CN | 110399373 A | | 11/2019 |
|---|---|---|---|
| CN | 110515978 A | | 11/2019 |
| CN | 110751469 A | * | 2/2020 |
| CN | 111242620 A | | 6/2020 |

OTHER PUBLICATIONS

International Search Report and Written Opinion dated Oct. 27, 2021, for International Application No. PCT/CN2021/114533, filed Aug. 25, 2021.

* cited by examiner

TRUSTLESS OPERATIONS FOR BLOCKCHAIN NETWORKS

BACKGROUND

The present disclosure relates generally to the field of verifying blockchain procedures, and more specifically to blockchain processing of queries and smart contract functions.

Blockchains offer immutability of data by replicating data across all nodes of a network. In order to be able to validate the blockchain, nodes must have access to the complete history of transactions, where any data on the chain is visible for all participants.

In a blockchain network, the hash of blocks in a sequence is a tamper-proof sequence because as a function of the design, a hash is very sensitive. A change to any variable of any one of the hashes in a given block would cause a cascading effect, altering all linked entries in the block. Hashes in a blockchain network are deterministic, meaning that identical input data will produce an identical result each time it is entered.

SUMMARY

Embodiments of the present disclosure include a method, system, and computer program product for trustless operations for blockchain networks.

Some embodiments of the present disclosure can be illustrated by a method comprising, receiving, by an orderer, an endorsed operation for a blockchain network, applying, by the orderer, the operation, including, based on the applying, a list comprising the operation in a subsequent block, and committing the subsequent block to a ledger of the blockchain network.

Some embodiments of the present disclosure can be illustrated by a method comprising, receiving an operation for a blockchain network, preparing, for the operation, a set including a read and an output, and committing, by the orderer according to an output portion of the set, the operation to a ledger of the blockchain network.

Some embodiments of the present disclosure can also be illustrated by a system comprising a memory, and a processor in communication with the memory, the processor being configured to perform functions comprising receiving, by an orderer, an endorsed operation for a blockchain network, applying, by the orderer, the operation, including, based on the applying, a list comprising the operation in a subsequent block, and committing the subsequent block to a ledger of the blockchain network.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
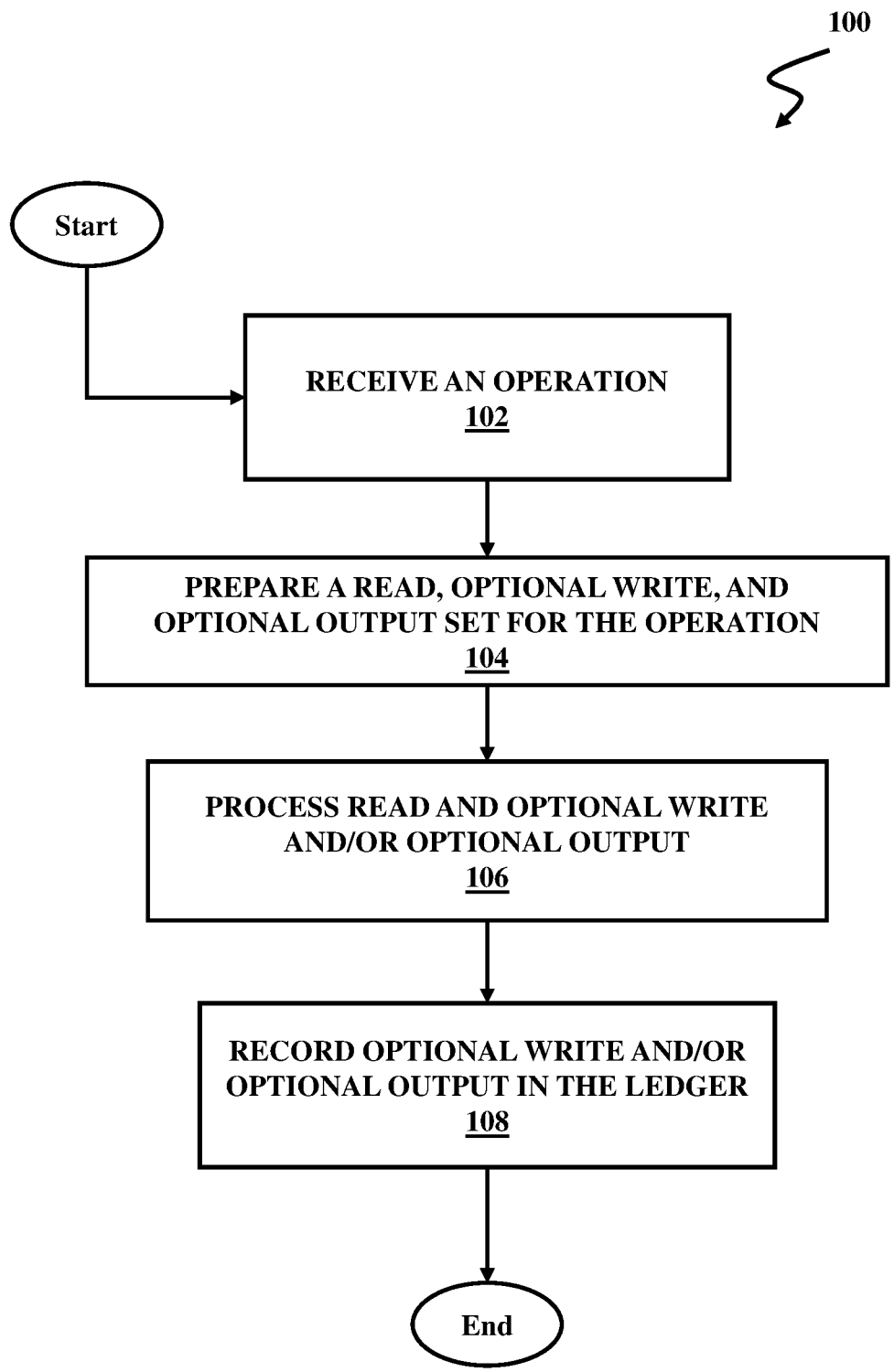
FIG. 1 illustrates a flow diagram for trustless operations in a blockchain network, according to example embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cryptographic proofs, and more specifically to trustless operations for blockchain networks.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device may also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Detailed herein is a method, system, and computer program product that utilize blockchain (e.g., hyperledger fabric) channels, and smart contracts that implement logic based on a non-interactive zero knowledge proof.

In some embodiments, the method, system, and/or computer program product utilize a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public or permission-less blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, information, and the like.

Further, in some embodiments, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The method, system, and/or computer program product can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded.

An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

In some embodiments, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node).

Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing/confirming transactions and modifying a world state of the blockchain, which is another name for the initial blockchain transaction which normally includes control and setup information.

In some embodiments, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

In some embodiments, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the method, system, and/or computer program product described herein is implemented due to immutable accountability, security, privacy, permitted decentralization, availability of smart contracts, endorsements and accessibility that are inherent and unique to blockchain.

In particular, the blockchain ledger data is immutable and that provides for an efficient method for processing trustless operations. Also, use of the encryption in the blockchain provides security and builds trust. The smart contract manages the state of the asset to complete the life-cycle, thus characteristics of the blockchain may be leveraged to provide a means of processing trustless operations. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set, and write-set. In other words, the blockchain inherent features provide for efficient implementation of processing a private transaction in a blockchain network.

One of the benefits of the example embodiments is that it improves the functionality of a computing system by implementing a method for processing private operations (e.g., a transaction, a query, or some part of a transaction or query) in a blockchain network. Through the blockchain method, system, and/or computer program product described herein, a computing system (or a processor in the computing system) can perform functionality for private transaction processing utilizing blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a network of users and on-board/off-board organizations to collaborate and execute service processes in the form of smart contracts.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

Some blockchain operations (such as a transaction with a read-write set) guarantee immutability due to cryptographic linking, but others (such as queries) do not have such a feature. This disclosure describes a method by which querying a single peer may provide a security guarantee.

Typically, a client may not directly access the network, but instead works through a peer. For example, a client may query a blockchain network (e.g., for the status of a smart-contract) by interacting with one peer (single-point of access). However, trusting a single peer may create issues. For example, if such a peer is corrupted the response may contain errors. One possibility to deal with trust issues from a single-point of failure consists of submitting the same operation (e.g., a query or transaction) to several peers and validating that the responses from all or a majority of the peers match. However, this system creates a burden on the client by requiring them to resubmit the operation to enough peers to ensure validity. Furthermore, validating an operation through several peers may require multiple remote connections thereby burdening the system.

In some instances, even operations that are included in a hyperledger fabric block (e.g., smart contract transactions) may face an issue. While endorsed transactions may contain enough signatures for inclusion in a block, it is still unknown which transactions will be invalidated by peers during block processing due to factors such as multiversion concurrency control or endorsing policies, among others. In other words, a smart-contract state is unknown until transactions are validated and committed. Operations included in a block may be invalidated, so returning that an entry has been included in a block does not necessarily mean that it will be validated. For example, suppose a client requests an average of a given value from a hyperledger fabric network. The current average may be placed in the write part of a read-write-set. However, any such transactions included in a block may get invalidated due to multiversion concurrency control (MVCC) or endorsing policy. Merely querying current average sale prices for a smart contract from a single peer may require full trust of the single peer. In order to ensure trustless querying by fetching data from a single peer, some embodiments herein may rely on cryptographic proofs of operation application.

In some embodiments, data derived from committed transactions may be included into blocks because data that has already been committed cannot be invalidated. In some embodiments, an optional output may be added to transactions, where the optional output adds additional information that does not involve any state changes to the ledger.

Referring now to FIG. 1, illustrated is a flowchart of an example method 100 for trustless operations in a blockchain network, in accordance with example embodiments. In some embodiments, the method 100 is performed by a processor on a blockchain network or in communication with a blockchain network.

In some embodiments, the method 100 begins at step 102, where a blockchain network receives an operation. In a first example, the operation may be a change to a smart contract. In a second example, the operation may be a query about values stored on the ledger. More details of processing operations may be found throughout the application, but specifically in FIG. 4B and FIG. 5A-C. For example, the operation (e.g., a transaction) may be a deploy, invoke, or query, and may be issued through a client-side application. The peer may verify the client signature and execute a chaincode function to initiate the transaction. The output may include the chaincode results, a set of key/value versions that were read in the chaincode (read set), and the set of keys/values that were written in chaincode (write set).

In some embodiments, the method 100 continues with step 104, where a set comprising a read, an optional write, and an optional output is prepared for the operation. During the processing of a transaction at a peer (e.g., an endorser), a read-write?-output? (the "?" denoting that the write are optional depending on the requirements of the operation i.e., read-optional write-optional output) set may be prepared for the transaction. In some embodiments, all operations may have a read, but the write and output will be dependent on the requirements of the operation. Operations that require a change to the state of the ledger may require a write. For example, a transaction with price change in a smart contract may require a change to the state of the ledger. Operations that require an output of information that will not change the ledger may require an output. For example, a query may ask a question such as "what was the average value for sales in 2019," but it will not change a smart contract.

In some embodiments, an orderer uses the read set portion of the read-write?-output? set for checking the validity of a transaction, the optional write set portion of the read-write?-output? set for updating the versions and the values in relevant parts of the ledger (e.g., affected keys), and/or the optional output set for recording relevant information (e.g., the result of a query) on the ledger that does not change the state of the ledger. For example, the read set portion may contain a list of unique keys and their committed version numbers (but not values) that the operation (e.g. a transaction or query) reads during simulation. In some embodiments, a state of the ledger is the same before and after committing the output portion of the set The optional write set portion may contain a list of unique keys and their new values that the operation writes to change the state of the ledger. The optional output set may contain the result of an operation (e.g., a transaction or a query) regarding the keys or values that may be written to the ledger but may not change the state of the ledger. Other operations may require both a write and an output.

In some embodiments, the selection of the optional write and output components may be based on the operation that is received from the client. For example, the operation may be a transaction with a change to the ledger and an inquiry into the state of the ledger. In some embodiments, the set may be only a read-output that may function similarly to a query, but the output may be recorded on the ledger (in step 108). For example, the operation may be a query from the client on the average sales price for a particular month. The output may be a recording of the particular price for the given month. In some embodiments, the set may be a read-write-output where the write may change the state of the ledger and the output may be written to the ledger. For example, the operation could include a change to a price for a given part in a smart contract and a request for the average sale price for the part. In some embodiments, the write may be based on the output. For example, the operation could include a request for the average sale price for a part and a change to the price of the part based on the average (e.g., make the price the average sale price).

In step 106, the read-write?-output? set for the operation may be processed. The processing may include endorsing by one or more peers and ordering the endorsed operations into blocks by the orderer. More details of processing operations (e.g., a transaction or a query) are provided in FIG. 4B and other places throughout the disclosure. In some embodiments, a query is subject to endorsing policies. For example, a given number of peers may be required to endorse the read-query set before it is included into a block. In some embodiments, the endorsing policies may depend on the type of operation. For example, a read-output set may require fewer endorsing peers than a read-write set. In some embodiments, the order will validate the output before inclusion in the block, and once the orderer has validated the output, the output may not be invalidated. The validation of the output can be assured given that no smart-contract state change is made. Once the operation is processed, the method may continue to step 108.

In step 108, the optional write and/or the optional output may be recorded in the ledger. In some embodiments, the write may change the state of the ledger. More details of the write process are given in 4A and FIG. 6A. In some embodiments, the optional output may be recorded on the ledger, but may not change the state of the ledger. For example, a write may make a change to a smart contract that may affect future operations on a smart contract, but an output is a recording of information on the smart contract that may not affect the processing of the smart contract directly.

In some embodiments, after recording, a client may reference the recorded output in the ledger to verify that the output has been validated. For example, when a client obtains an operation from a single peer, the client may determine if the operation was validated by checking in the next block to see if the operation was included in the list of validated operations. Blocks may be signed by Orderer nodes, so the client can validate the signature of the blocks for security/trust purposes. In some embodiments, the output may be provided to the client before including in a block and the client may verify that the orderer validated the output by referencing the output entry on the ledger. In some embodiments, the output may be provided to other clients. For example, if the system processes an operation with a read-output set from a first client and a second client submits the same operation, the system does not need to process the output again. The system may provide the second client with the output entry on the ledger. In this fashion, the second client may receive a verifiable result without reprocessing the operation.

Figure 2:
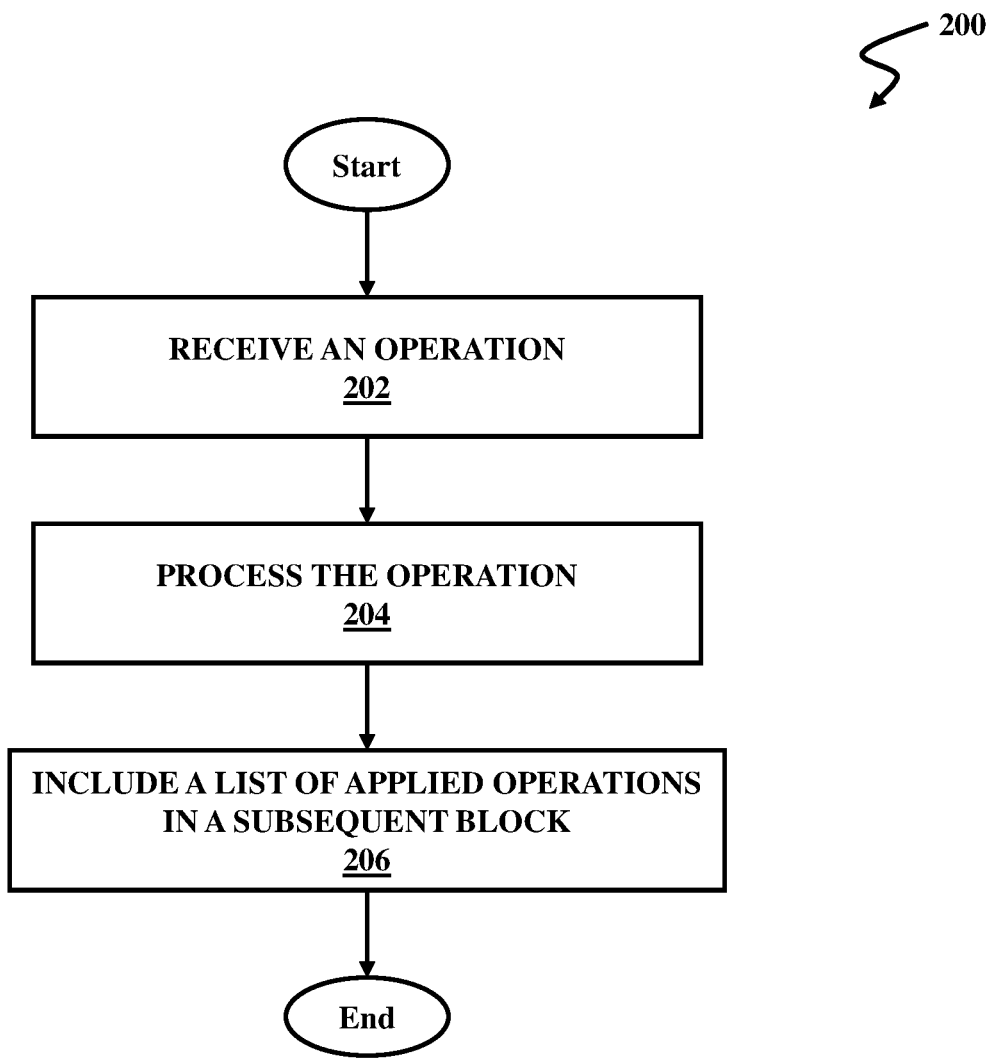
FIG. 2 illustrates an example method of recording an application of an operation to a subsequent block

FIG. 2 depicts an example method 200 of recording an application of an operation to a subsequent block. Method 200 begins at step 202 where after endorsement by the peers the operation is received by an orderer.

After the operation is received, in step 204 the orderer may process the operation. Processing may include actions taken by one or more peers and/or information sent to the client. More details of processing operations may be found throughout the application, but specifically in FIG. 4B and FIG. 5A-C. In some embodiments, processing may comprise applying or invalidating the operations, organizing the operation into a first block, and sending the first block for validation/inclusion in the ledger. In some embodiments, applying includes verifying that the endorsement policy of the blockchain is met for a given operation. For example, an endorsement policy requirement may be that at least 51% of the nodes endorsed the operation. In some embodiments, applying may comprise including an operation in a block and committing the operation to the state of the ledger. For example, for an operation that includes a modification to a smart contract, applying may comprise 1) verifying that the modification has comported with the endorsement rules for the blockchain, and/or 2) committing the modification to the ledger. In some embodiments, for operations (e.g., queries) that do not require writing to the ledger, applying may include a verification by the orderer that the operation comported with the endorsement rules of the system but may not include committing to the ledger. For example, a query result is not typically recorded on the ledger. Therefore, for a query, the applying may be a verification by the orderer that the query was endorsed by enough nodes to comply with the endorsement rules of the system. In some embodiments, the endorsement rules for the system may depend on the type of operation. For example, a query may have a lower endorsement threshold than a transaction with a write set.

In some embodiments, the processing may be similar to the process described in FIG. 1 with a read-write?-output? set. For example, the applying may be the write to the ledger or the recording of the output in the ledger.

In step 206, the application of an operation included in a first block is listed in a subsequent block as an application entry. In some embodiments, a list of applied transactions from a first block may be recorded in the ledger with a second block. For example, multiple transactions may be applied in the first block and recorded in a hashed list in a second block. In some embodiments, the application entry of a transaction may indicate if the transaction was applied or invalidated. For example, if a query was validated, a hash of the identifier (ID) or the ID may be listed as the application entry in a subsequent block. In some embodiments, the application entry may indicate if the operation was applied, and any operations that are not listed applied may be assumed to be invalidated. For example, if a client submits a query and receives a result, but the query ID does not appear in an applied operation ID list for the subsequent blocks, the client may assume that the operation was invalid and resubmit the query.

In some embodiments, the subsequent block may include a hash of the list of applied operations, instead of the identification numbers. A space-efficient probabilistic data structure, such as a bloom filter, may be used instead of, or in conjunction with, a list. In some embodiments, a probabilistic data structure may be used by the client, or any other entity, to determine if an operation ID is included or not. In some embodiments, the probability of false positives given by the filter may be managed when a block is generated by modifying the data structure to limit the possibility of a false positive. In some embodiments, a hash function, such as merkle tree, may be used to generate a root hash from of the validated operations from a block and included in a subsequent block.

In some embodiments, an operation ID may be provided to the client before the operation is settled in the ledger. After the operation is settled in the ledger on the applied operation list (e.g., root hash of the list), the list may be provided to the client.

In some embodiments, a client may compare an operation ID to the recorded list (e.g., the root hash) to determine if the operation was indeed applied and did not get invalidated. In some embodiments, the operation ID and recorded list may be provided to other clients. For example, if the system processes a query from a first client and a second client submits the same query as the client, the system does not need to process the query again, but only provide the second client with the result and the list. In this fashion, the second client may receive a verifiable result without reprocessing the query.

Figure 3:
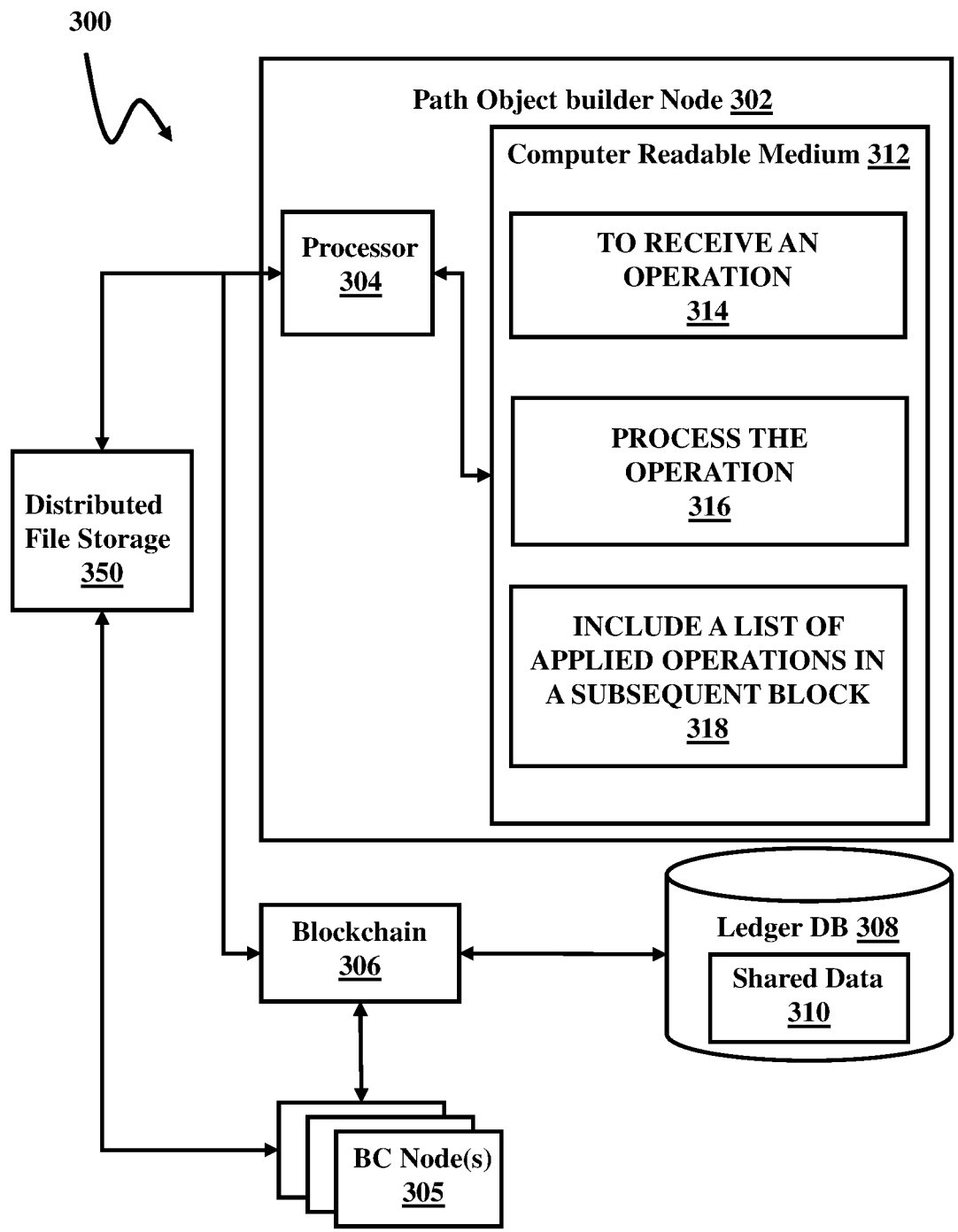
FIG. 3 illustrates a network diagram of a system including a database, according to an example embodiment.

FIG. 3 illustrates a logic network diagram for smart data annotation in blockchain networks, according to example embodiments.

Referring to FIG. 3, the example network 300 includes a node 302 connected to other blockchain (BC) nodes 305 representing document-owner organizations. The node 302 may be connected to a blockchain 306 that has a ledger 308 for storing data to be shared (310) among the nodes 305. While this example describes in detail only one node 302, multiple such nodes may be connected to the blockchain 306. It should be understood that the node 302 may include additional components and that some of the components described herein may be removed and/or modified without departing from a scope of the node 302 disclosed herein. The node 302 may be a computing device or a server computer, or the like, and may include a processor 304, which may be a semiconductor-based microprocessor, a central processing unit (CPU), an application specific integrated circuit (ASIC), a field-programmable gate array (FPGA), and/or another hardware device. Although a single processor 304 is depicted, it should be understood that the node 302 may include multiple processors, multiple cores, or the like, without departing from the scope of the node 302 system. A distributed file storage 350 may be accessible to processor node 302 and other BC nodes 305. The distributed file storage may be used to store documents identified in ledger (distributed file storage) 350.

The node 302 may also include a non-transitory computer readable medium 312 that may have stored thereon machine-readable instructions executable by the processor 304. Examples of the machine-readable instructions are shown as 314-318 and are further discussed below. Examples of the non-transitory computer readable medium 312 may include an electronic, magnetic, optical, or other physical storage device that contains or stores executable instructions. For example, the non-transitory computer readable medium 312 may be a Random Access memory (RAM), an Electrically Erasable Programmable Read-Only Memory (EEPROM), a hard disk, an optical disc, or other type of storage device.

The processor 304 may execute the machine-readable instructions 314 to receive an operation. As discussed above, the blockchain ledger 308 may store data to be shared among the nodes 305. The blockchain 306 network may be configured to use one or more smart contracts that manage transactions for multiple participating nodes. Documents linked to the annotation information may be stored in distributed file storage 350. The processor 304 may execute the machine-readable instructions 316 to process the operation. The processor 304 may execute the machine-readable instructions 318 include a list of applied operations in a subsequent block.

Figure 4A:
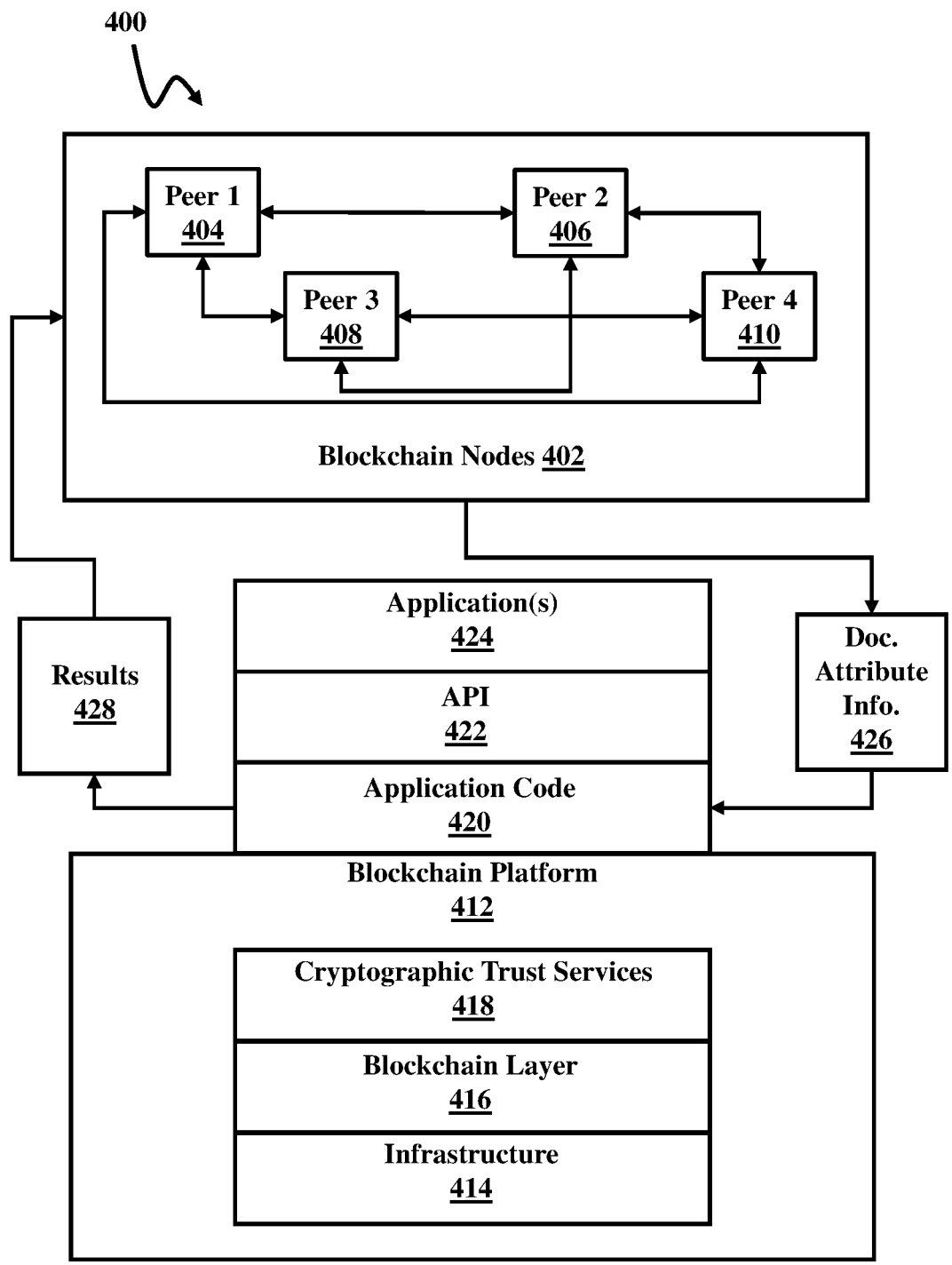
FIG. 4A illustrates an example blockchain architecture configuration, according to example embodiments.

FIG. 4A illustrates a blockchain architecture configuration 400, according to example embodiments. Referring to FIG. 4A, the blockchain architecture 400 may include certain blockchain elements, for example, a group of blockchain nodes 402. The blockchain nodes 402 may include one or more peer nodes 404-410 (these four nodes are depicted by example only). These nodes participate in a number of activities, such as blockchain transaction addition and validation process (consensus). One or more of the blockchain nodes 404-410 may endorse transactions based on endorsement policy and may provide an ordering service for all blockchain nodes in the architecture 400. A blockchain node may initiate a blockchain authentication and seek to write to a blockchain immutable ledger stored in blockchain layer 416, a copy of which may also be stored on the underpinning physical infrastructure 414. The blockchain configuration may include one or more applications 424 which are linked to application programming interfaces (APIs) 422 to access and execute stored program/application code 420 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 404-410.

The blockchain base or platform 412 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 416 may expose an interface that provides access to the virtual execution environment necessary to process the program code and engage the physical infrastructure 414. Cryptographic trust services 418 may be used to verify transactions such as asset exchange transactions and keep information private.

The blockchain architecture configuration of FIG. 4A may process and execute program/application code 420 via one or more interfaces exposed, and services provided, by blockchain platform 412. The code 420 may control blockchain assets. For example, the code 420 can store and transfer data, and may be executed by nodes 404-410 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the document attribute(s) information 426 may be processed by one or more processing entities (e.g., virtual machines) included in the blockchain layer 416. The result 428 may include a plurality of linked shared documents. The physical infrastructure 414 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 4B:
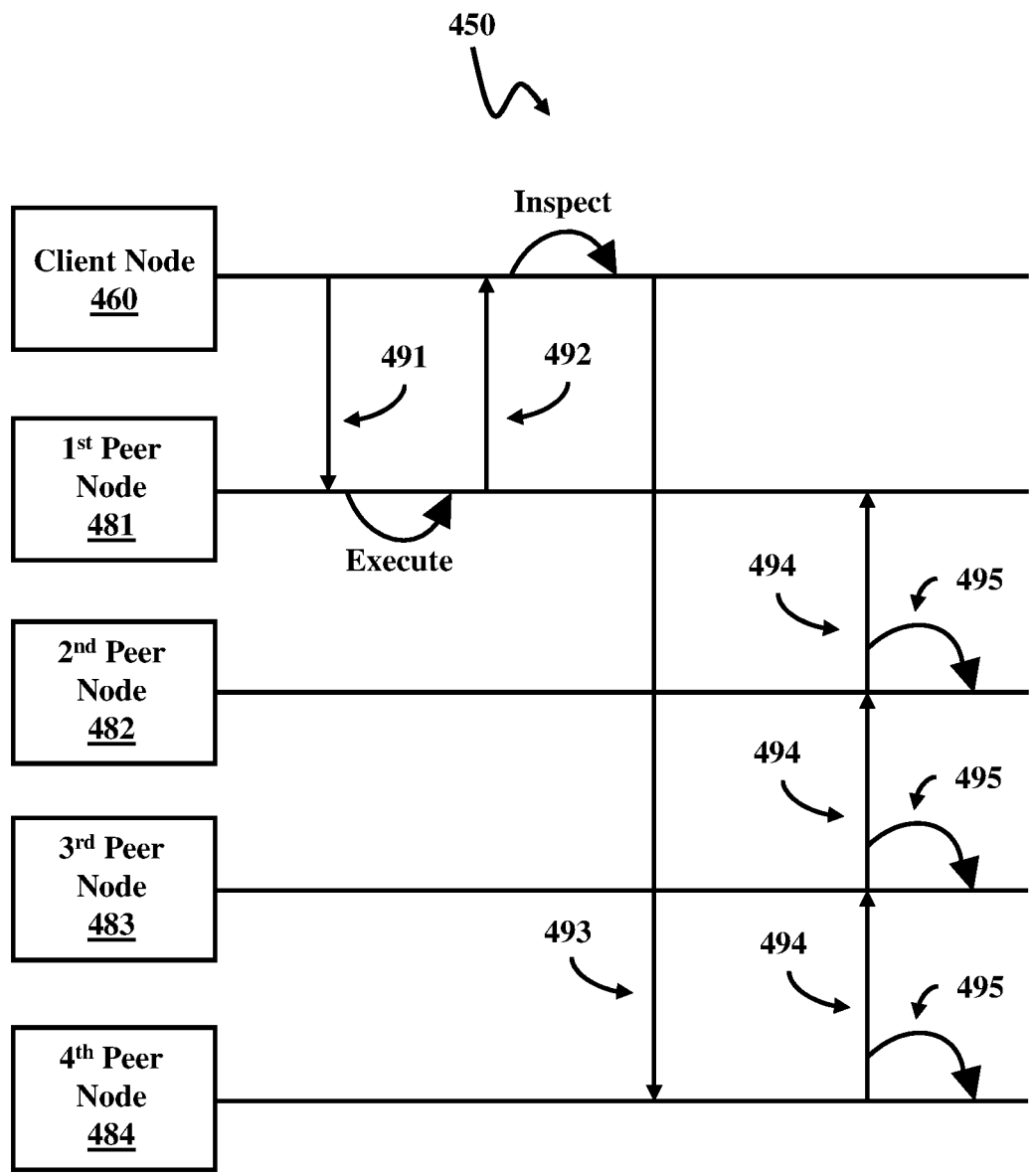
FIG. 4B illustrates a blockchain transactional flow, according to example embodiments.

FIG. 4B illustrates an example of a blockchain transactional flow 450 between nodes of the blockchain in accordance with an example embodiment. Referring to FIG. 4B a general description of transactional flow 450 will be given followed by a more specific example. The transaction flow may include a transaction proposal 491 sent by an application client node 460 to an endorsing peer node 481. The endorsing peer node 481 may verify the client signature and execute a chaincode function to initiate the transaction. The output may include the chaincode results, a set of key/value versions that were read in the chaincode (read set), and the set of keys/values that were written in chaincode (write set). The proposal response 492 is sent back to the client 460 along with an endorsement signature, if approved. The client 460 assembles the endorsements into a transaction payload 493 and broadcasts it to an ordering service node 484. The ordering service node 484 then delivers ordered transactions as blocks to all peers 481-483 on a channel. Before committal to the blockchain, each peer 481-483 may validate the transaction. For example, the peers may check the endorsement policy to ensure that the correct allotment of the specified peers have signed the results and authenticated the signatures against the transaction payload 493. In some embodiments, one or more of the peers may be the manager nodes.

A more specific description of transactional flow 450 can be understood with a more specific example. To begin, the client node 460 initiates the transaction 491 by constructing and sending a request to the peer node 481, which is an endorser. The client 460 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 481 may verify (a) that the transaction proposal is well formed, (b) the transaction has not been submitted already in the past (replay-attack protection), (c) the signature is valid, and (d) that the submitter (client 460, in the example) is properly authorized to perform the proposed operation on that channel. The endorsing peer node 481 may take the transaction proposal inputs as arguments to the invoked chaincode function. The chaincode is then executed against a current state database to produce transaction results including a response value, read set, and write set. However, no updates are made to the ledger at this point. In 492, the set of values, along with the endorsing peer node's 481 signature is passed back as a proposal response 492 to the SDK of the client 460 which parses the payload for the application to consume.

In response, the application of the client 460 inspects/verifies the endorsing peers signatures and compares the proposal responses to determine if the proposal response is the same. If the chaincode only queried the ledger, the application would inspect the query response and would typically not submit the transaction to the ordering service node 484. If the client application intends to submit the transaction to the ordering service node 484 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node may need to endorse the transaction. The architecture is such that even if an application selects not to inspect responses or otherwise forwards an unendorsed transaction, the endorsement policy may still be enforced by peers and upheld at the commit validation phase.

After successful inspection, the client 460 assembles endorsements into a transaction 493 and broadcasts the transaction proposal and response within a transaction message to the ordering node 484. The transaction may contain the read/write sets, the endorsing peers signatures and a channel ID. The ordering node 484 does not need to inspect the entire content of a transaction in order to perform its operation. Instead, the ordering node 484 may simply receive transactions from all channels in the network, order them chronologically by channel, and create blocks of transactions per channel.

The blocks of the transaction are delivered from the ordering node 484 to all peer nodes 481-483 on the channel. The transactions 494 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 495 each peer node 481-483 appends the block to the channel's chain, and for each valid transaction the write sets are committed to current state database. An event is emitted to notify the client application that the transaction (invocation) has been immutably appended to the chain, as well as to notify whether the transaction was validated or invalidated.

Figure 5A:
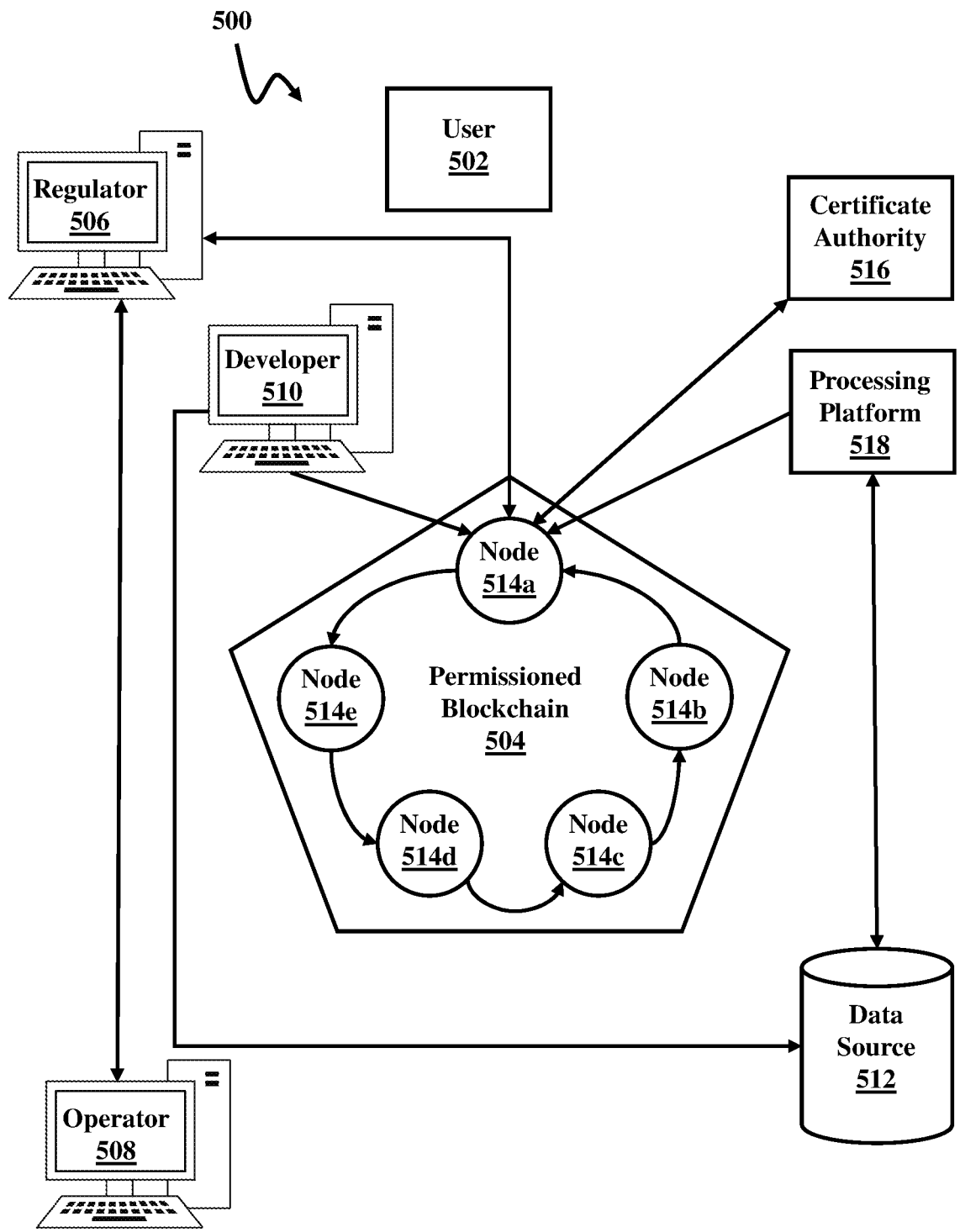
FIG. 5A illustrates a permissioned network, according to example embodiments.

FIG. 5A illustrates an example of a permissioned blockchain network 500, which features a distributed, decentralized peer-to-peer architecture. In this example, a blockchain user 502 may initiate a transaction to the permissioned blockchain 504. In this example, the transaction can be a deploy, invoke, or query, and may be issued through a client-side application leveraging an SDK, directly through an API, etc. Networks may provide access to a regulator 506, such as an auditor. A blockchain network operator 508 manages member permissions, such as enrolling the regulator 506 as an "auditor" and the blockchain user 502 as a "client." An auditor may be restricted only to querying the ledger whereas a client may be authorized to deploy, invoke, and query certain types of chaincode.

A blockchain developer 510 can write chaincode and client-side applications. The blockchain developer 510 can deploy chaincode directly to the network through an interface. To include credentials from a traditional data source 512 in chaincode, the developer 510 may use an out-of-band connection to access the data. In this example, the blockchain user 502 connects to the permissioned blockchain 504 through one of peer nodes 514 (referring to any one of nodes 514a-e). Before proceeding with any transactions, the peer node 514 (e.g., node 514a) retrieves the user's enrollment and transaction certificates from a certificate authority 516, which manages user roles and permissions. In some cases, blockchain users must possess these digital certificates in order to transact on the permissioned blockchain 504. Meanwhile, a user attempting to utilize chaincode may be required to verify their credentials on the traditional data source 512. To confirm the user's authorization, chaincode can use an out-of-band connection to this data through a traditional processing platform 518.

Figure 5B:
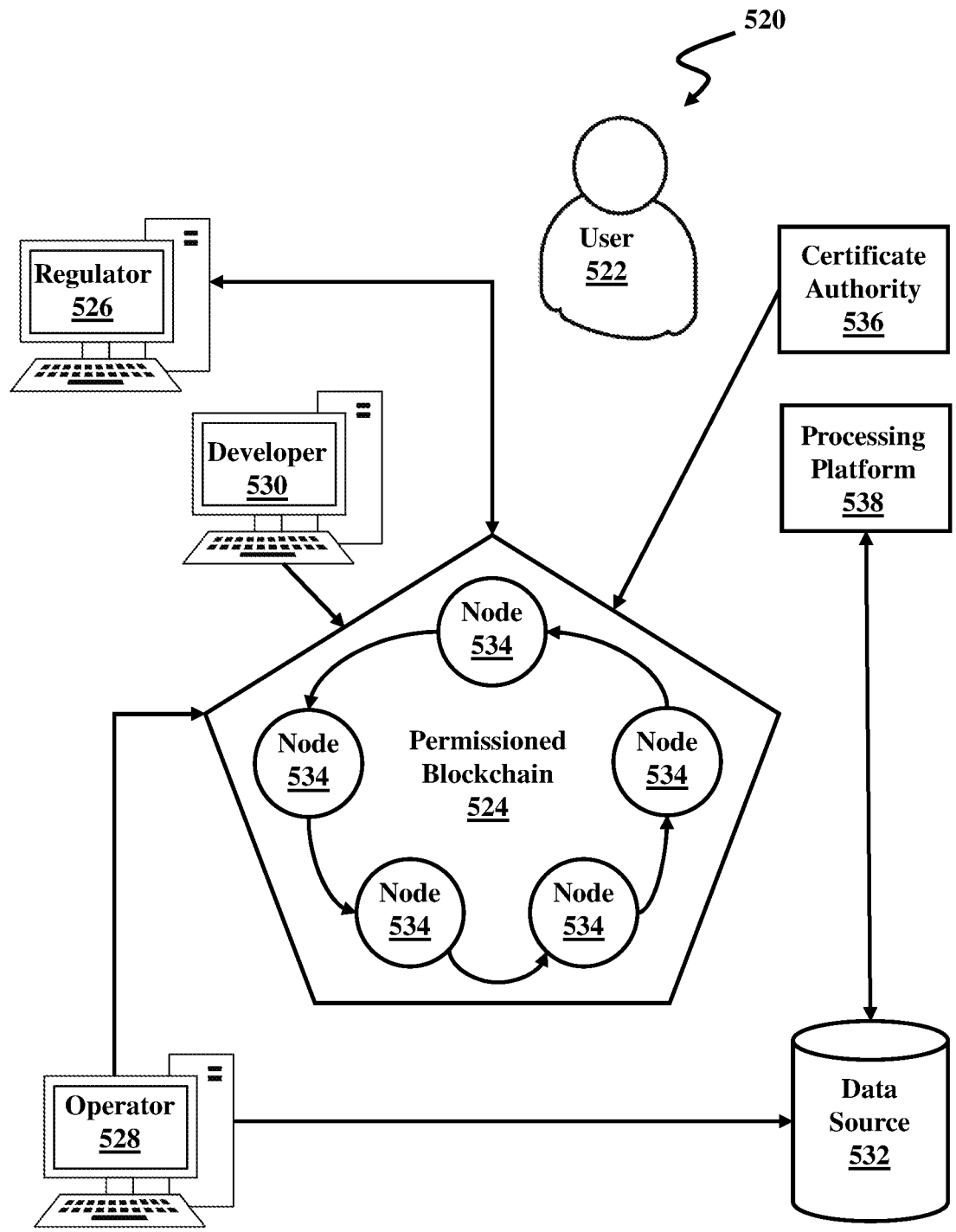
FIG. 5B illustrates another permissioned network, according to example embodiments.

FIG. 5B illustrates another example of a permissioned blockchain network 520, which features a distributed, decentralized peer-to-peer architecture. In this example, a blockchain user 522 may submit a transaction to the permissioned blockchain 524. In this example, the transaction can be a deploy, invoke, or query, and may be issued through a client-side application leveraging an SDK, directly through an API, etc. Networks may provide access to a regulator 526, such as an auditor. A blockchain network operator 528 manages member permissions, such as enrolling the regulator 526 as an "auditor" and the blockchain user 522 as a "client." An auditor may be restricted to only querying the ledger whereas a client may be authorized to deploy, invoke, and query certain types of chaincode.

A blockchain developer 530 writes chaincode and client-side applications. The blockchain developer 530 can deploy chaincode directly to the network through an interface. To include credentials from a traditional data source 532 in chaincode, the developer 530 may use an out-of-band connection to access the data. In this example, the blockchain user 522 connects to the network through a peer node 534. Before proceeding with any transactions, the peer node 534 retrieves the user's enrollment and transaction certificates from the certificate authority 536. In some cases, blockchain users must possess these digital certificates in order to transact on the permissioned blockchain 524. Meanwhile, a user attempting to utilize chaincode may be required to verify their credentials on the traditional data source 532. To confirm the user's authorization, chaincode can use an out-of-band connection to this data through a traditional processing platform 538.

In some embodiments of the present disclosure, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 5C:
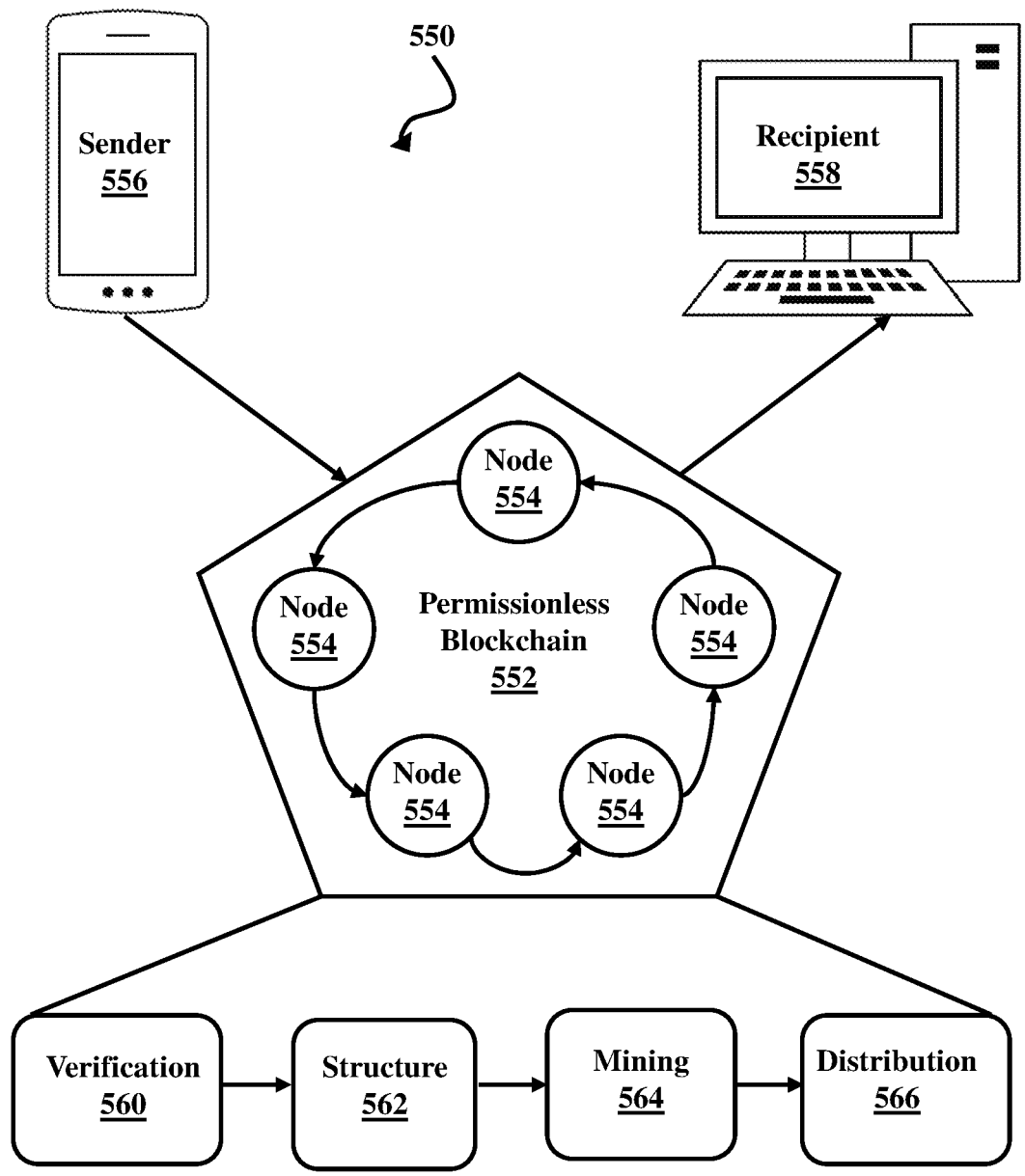
FIG. 5C illustrates a permissionless network, according to example embodiments.

FIG. 5C illustrates a process 550 of a transaction being processed by a permissionless blockchain 552 including a plurality of nodes 554. A sender 556 desires to send payment or some other form of value (e.g., a deed, medical records, a contract, a good, a service, or any other asset that can be encapsulated in a digital record) to a recipient 558 via the permissionless blockchain 552. In some embodiments, each of the sender device 556 and the recipient device 558 may have digital wallets (associated with the blockchain 552) that provide user interface controls and a display of transaction parameters. In response, the transaction is broadcast throughout the blockchain 552 to the nodes 554.

Depending on the blockchain's 552 network parameters the nodes verify 560 the transaction based on rules (which may be pre-defined or dynamically allocated) established by the permissionless blockchain 552 creators. For example, this may include verifying identities of the parties involved, etc. The transaction may be verified immediately or it may be placed in a queue with other transactions and the nodes 554 determine if the transactions are valid based on a set of network rules.

In structure 562, valid transactions are formed into a block and sealed with a lock (hash). This process may be performed by mining nodes among the nodes 554. Mining nodes may utilize additional software specifically for mining and creating blocks for the permissionless blockchain 552. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 552 may include a proof-of-work (PoW) which is a solution to a puzzle derived from the block's header. Although not shown in the example of FIG. 5C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 564, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 566, the successfully validated block is distributed through the permissionless blockchain 552 and all nodes 554 add the block to a majority chain which is the permissionless blockchain's 552 auditable ledger. Furthermore, the value in the transaction submitted by the sender 556 is deposited or otherwise transferred to the digital wallet of the recipient device 558.

Figure 6A:
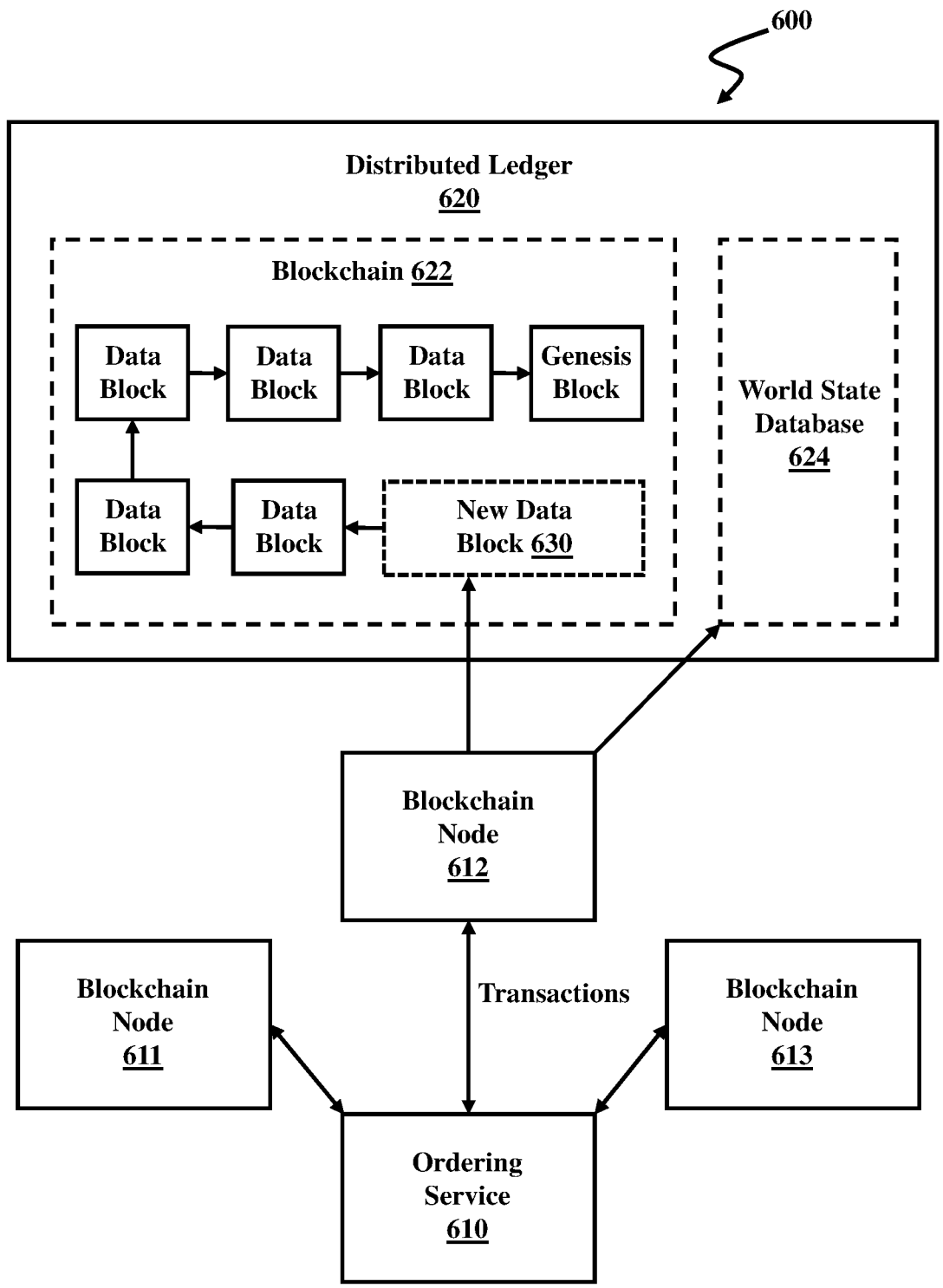
FIG. 6A illustrates a process for a new block being added to a distributed ledger, according to example embodiments.
Figure 6B:
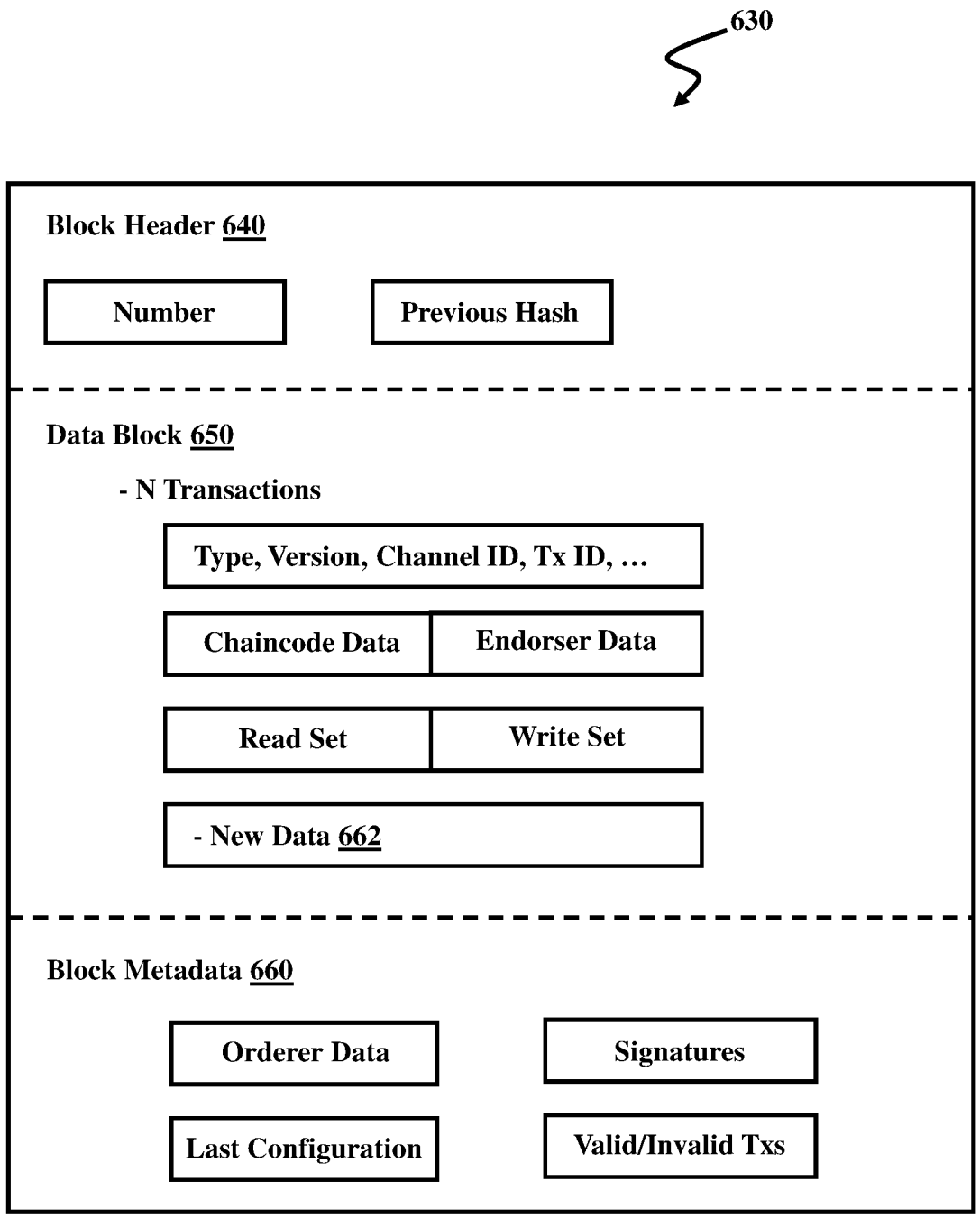
FIG. 6B illustrates contents of a new data block, according to example embodiments.

FIG. 6A illustrates a process 600 of a new block being added to a distributed ledger 620, according to example embodiments, and FIG. 6B illustrates contents of a new data block structure 630 for blockchain, according to example embodiments. The new data block 630 may contain document linking data.

Referring to FIG. 6A, clients (not shown) may submit transactions to blockchain nodes 611, 612, and/or 613. Clients may be instructions received from any source to enact activity on the distributed ledger 620. As an example, clients may be applications that act on behalf of a requester, such as a device, person or entity to propose transactions for the blockchain. The plurality of blockchain peers (e.g., blockchain nodes 611, 612, and 613) may maintain a state of the blockchain network and a copy of the distributed ledger 620. Different types of blockchain nodes/peers may be present in the blockchain network including endorsing peers which simulate and endorse transactions proposed by clients and committing peers which verify endorsements, validate transactions, and commit transactions to the distributed ledger 620. In this example, the blockchain nodes 611, 612, and 613 may perform the role of endorser node, committer node, or both.

The distributed ledger 620 includes a blockchain which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 is a transaction log, structured as hash-linked blocks where each block contains a sequence of N transactions. Blocks may include various components such as shown in FIG. 6B. The linking of the blocks (shown by arrows in FIG. 6A) may be generated by adding a hash of a prior block's header within a block header of a current block. In this way, all transactions on the blockchain 622 are sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 620 may be stored in the state database 624. Here, the current state data represents the latest values for all keys ever included in the chain transaction log of the blockchain 622. Chaincode invocations execute transactions against the current state in the state database 624. To make these chaincode interactions extremely efficient, the latest values of all keys are stored in the state database 624. The state database 624 may include an indexed view into the transaction log of the blockchain 622, it can therefore be regenerated from the chain at any time. The state database 624 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 610.

The ordering service 610 accepts endorsed transactions, orders them into a block, and delivers the blocks to the committing peers. For example, the ordering service 610 may initiate a new block when a threshold of transactions has been reached, a timer times out, or another condition. In the example of FIG. 6A, blockchain node 612 is a committing peer that has received a new data block 630 for storage on distributed ledger 620. The first block in the blockchain may be referred to as a genesis block which includes information about the blockchain, its members, the data stored therein, etc.

The ordering service 610 may be made up of a cluster of orderers. The ordering service 610 does not process transactions, smart contracts, or maintain the shared ledger. Rather, the ordering service 610 may accept the endorsed transactions and specifies the order in which those transactions are committed to the distributed ledger 620. The architecture of the blockchain network may be designed such that the specific implementation of 'ordering' (e.g., Solo, Kafka, BFT, etc.) becomes a pluggable component.

Transactions are written to the distributed ledger 620 in a consistent order. The order of transactions is established to ensure that the updates to the state database 624 are valid when they are committed to the network. Unlike a cryptocurrency blockchain system (e.g., Bitcoin, etc.) where ordering occurs through the solving of a cryptographic puzzle, or mining, in this example the parties of the distributed ledger 620 may choose the ordering mechanism that best suits that network.

When the ordering service 610 initializes a new data block 630, the new data block 630 may be broadcast to committing peers (e.g., blockchain nodes 611, 612, and 613). In response, each committing peer validates the transaction within the new data block 630 by checking to make sure that the read set and the write set still match the current world state in the state database 624. Specifically, the committing peer can determine whether the read data that existed when the endorsers simulated the transaction is identical to the current world state in the state database 624. When the committing peer validates the transaction, the transaction is written to the blockchain 622 on the distributed ledger 620, and the state database 624 is updated with the write data from the read-write set. If a transaction fails, that is, if the committing peer finds that the read-write set does not match the current world state in the state database 624, the transaction ordered into a block may still be included in that block, but it may be marked as invalid, and the state database 624 may not be updated.

Referring to FIG. 6B, a new data block 630 (also referred to as a data block) that is stored on the blockchain 622 of the distributed ledger 620 may include multiple data segments such as a block header 640, block data 650, and block metadata 660. It should be appreciated that the various depicted blocks and their contents, such as new data block 630 and its contents. Shown in FIG. 6B are merely examples and are not meant to limit the scope of the example embodiments. The new data block 630 may store transactional information of N transaction(s) (e.g., 1, 10, 100, 500, 1000, 2000, 3000, etc.) within the block data 650. The new data block 630 may also include a link to a previous block (e.g., on the blockchain 622 in FIG. 6A) within the block header 640. In particular, the block header 640 may include a hash of a previous block's header. The block header 640 may also include a unique block number, a hash of the block data 650 of the new data block 630, and the like. The block number of the new data block 630 may be unique and assigned in various orders, such as an incremental/sequential order starting from zero.

The block data 650 may store transactional information of each transaction that is recorded within the new data block 630. For example, the transaction data may include one or more of a type of the transaction, a version, a timestamp, a channel ID of the distributed ledger 620, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 650 may also store new data 662 which adds additional information to the hash-linked chain of blocks in the blockchain 622. The additional information includes one or more of the steps, features, processes and/or actions described or depicted herein. Accordingly, the new data 662 can be stored in an immutable log of blocks on the distributed ledger 620. Some of the benefits of storing such new data 662 are reflected in the various embodiments disclosed and depicted herein. Although in FIG. 6B the new data 662 is depicted in the block data 650 but may also be located in the block header 640 or the block metadata 660. The new data 662 may include a document composite key that is used for linking the documents within an organization.

The block metadata 660 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 610. Meanwhile, a committer of the block (such as blockchain node 612) may add validity/invalidity information based on an endorsement policy, verification of read/write sets, and the like. The transaction filter may include a byte array of a size equal to the number of transactions in the block data 650 and a validation code identifying whether a transaction was valid/invalid.

Figure 6C:
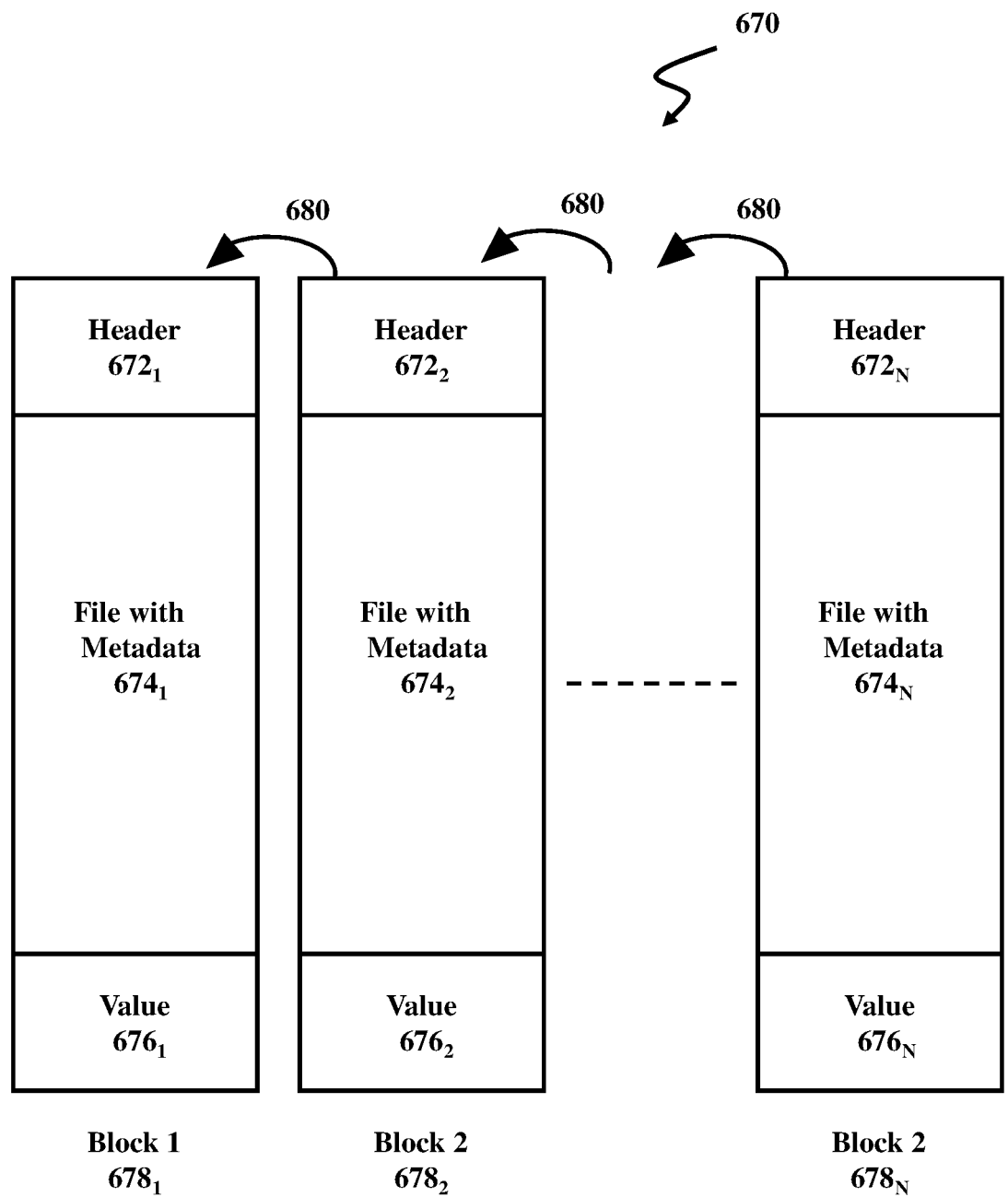
FIG. 6C illustrates a blockchain for digital content, according to example embodiments.

FIG. 6C illustrates an embodiment of a blockchain 670 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In some embodiments, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ....... | Block N |
|---|---|---|---|
| Hash Value 1 | Hash Value 2 | | Hash Value N |
| Digital Content 1 | Digital Content 2 | | Digital Content N |

In some embodiments, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| . | . |
| Block N Hash Value | Block N Hash Value ... Content |

In the example embodiment of FIG. 6C, the blockchain 670 includes a number of blocks $678_1$, $678_2$, . . . $678_N$ cryptographically linked in an ordered sequence, where $N \geq 1$. The encryption used to link the blocks $678_1$, $678_2, \ldots 678_N$ may be any of a number of keyed or un-keyed Hash functions. In one embodiment, the blocks $678_1$, $678_2, \ldots 678_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $678_1, 678_2, \ldots, 678_N$ may be cryptographically linked by a function that is different from a hash function. For purposes of illustration, the following description is made with reference to a hash function, e.g., SHA-2.

Each of the blocks $678_1, 678_2, \ldots, 678_N$ in the blockchain includes a header, a version of the file, and a value. The header and the value are different for each block as a result of hashing in the blockchain. In some embodiments, the value may be included in the header. As described in greater detail below, the version of the file may be the original file or a different version of the original file.

The first block $678_1$ in the blockchain is referred to as the genesis block and includes the header $672_1$, original file $674_1$, and an initial value $676_1$. The hashing scheme used for the genesis block, and indeed in all subsequent blocks, may vary. For example, all the information in the first block $678_1$ may be hashed together and at one time, or each or a portion of the information in the first block $678_1$ may be separately hashed and then a hash of the separately hashed portions may be performed.

The header $672_1$ may include one or more initial parameters, which, for example, may include a version number, timestamp, nonce, root information, difficulty level, consensus protocol, duration, media format, source, descriptive keywords, and/or other information associated with original file $674_1$ and/or the blockchain. The header $672_1$ may be generated automatically (e.g., by blockchain network managing software) or manually by a blockchain participant. Unlike the header in other blocks $678_2$ to $678_N$ in the blockchain, the header $672_1$ in the genesis block does not reference a previous block, simply because there is no previous block.

The original file $674_1$ in the genesis block may be, for example, data as captured by a device with or without processing prior to its inclusion in the blockchain. The original file $674_1$ is received through the interface of the system from the device, media source, or node. The original file $674_1$ is associated with metadata, which, for example, may be generated by a user, the device, and/or the system processor, either manually or automatically. The metadata may be included in the first block $678_1$ in association with the original file $674_1$.

The value $676_1$ in the genesis block is an initial value generated based on one or more unique attributes of the original file $674_1$. In some embodiments, the one or more unique attributes may include the hash value for the original file $674_1$, metadata for the original file $674_1$, and other information associated with the file. In one implementation, the initial value $676_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $678_2$ to $678_N$ in the blockchain also have headers, files, and values. However, unlike header $672_1$ the first block, each of the headers $672_2$ to $672_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 680, to establish an auditable and immutable chain-of-custody.

Each of the header $672_2$ to $672_N$ in the other blocks may also include other information, e.g., version number, timestamp, nonce, root information, difficulty level, consensus protocol, and/or other parameters or information associated with the corresponding files and/or the blockchain in general.

The files $674_2$ to $674_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $676_2$ to $676_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file may include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 6D:
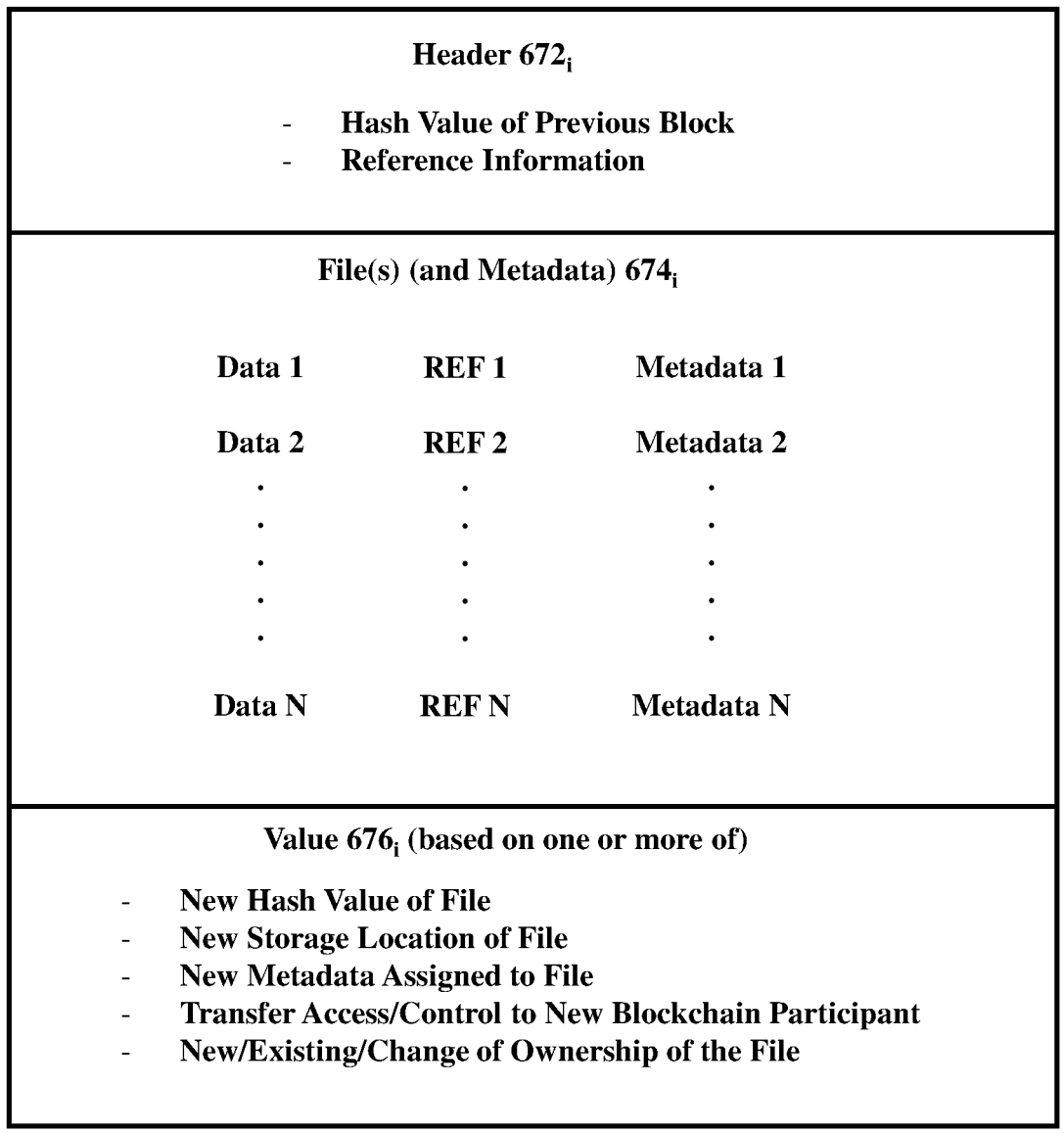
FIG. 6D illustrates a block which may represent the structure of blocks in the blockchain, according to example embodiments.

In some embodiments, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 6D illustrates an embodiment of a block which may represent the structure of the blocks in the blockchain 690 in accordance with one embodiment. The block, $Block_i$, includes a header $672_i$, a file $674_i$, and a value $676_i$.

The header $672_i$ includes a hash value of a previous block Blocki−1 and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $674_i$ includes a plurality of data, such as Data 1, Data 2, . . . , Data N in sequence. The data are tagged with Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $676_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 670 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender may have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
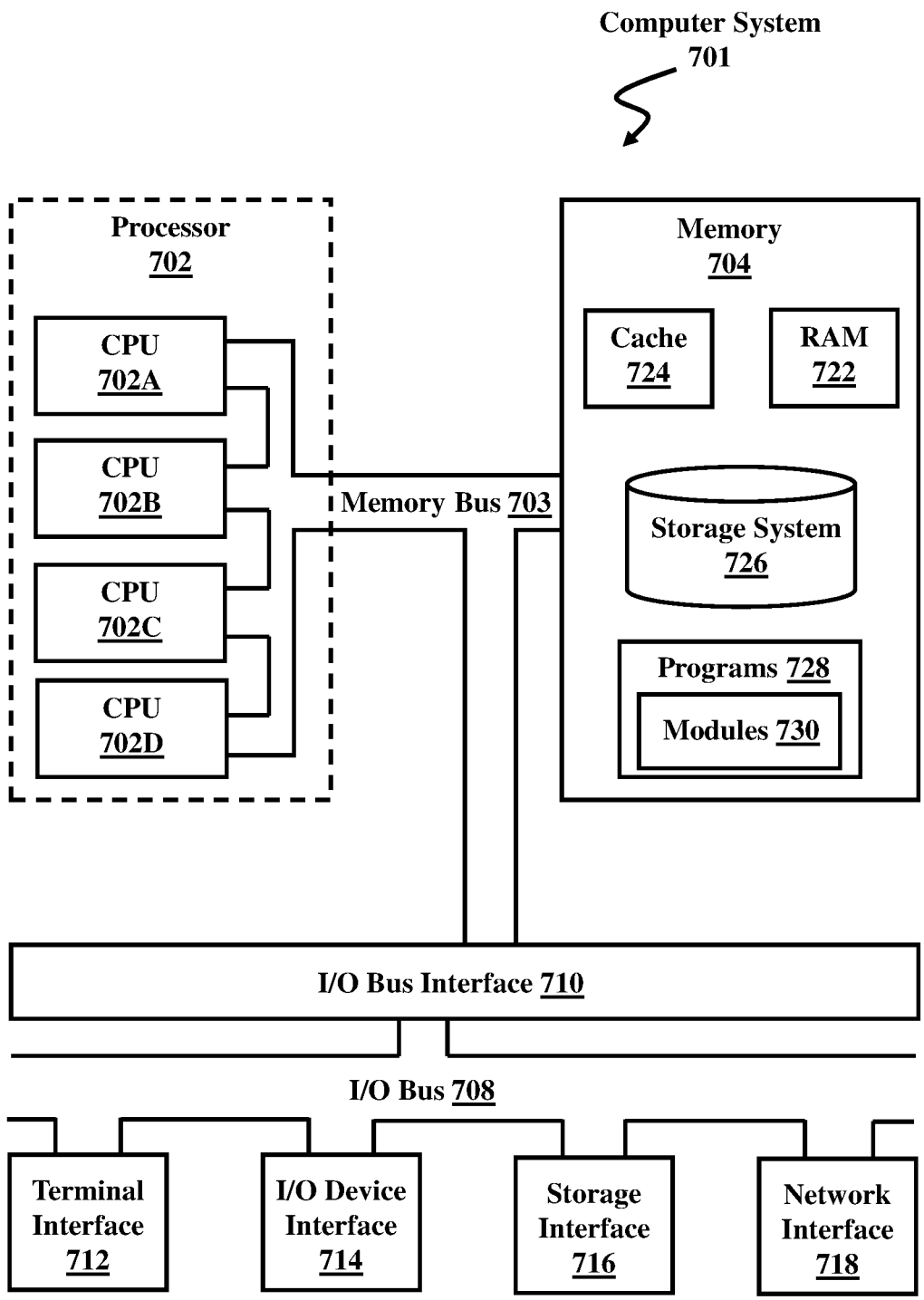
FIG. 7 illustrates a high-level block diagram of an example computer system that may be used in implementing one or more of the methods, tools, and modules, and any related functions, described herein, in accordance with embodiments of the present disclosure.

FIG. 7, illustrated is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   receiving, by an orderer, an endorsed operation for a blockchain network;
   applying, by the orderer, the endorsed operation to a current block;
   including, based on the applying, a hash of the current block and a list comprising the endorsed operation in a subsequent block, wherein the endorsed operation is recorded in the list, and wherein the list states that the endorsed operation was validated in the current block without processing a query to determine that the endorsed operation was validated; and
   committing the subsequent block to a ledger of the blockchain network, wherein a client submitting a second operation that is the same as the endorsed operation receives a result of the endorsed operation without processing the second operation.

2. A method of claim 1 further comprising:
   checking the endorsed operation against the list in the subsequent block to verify that the endorsed operation was applied.

3. A method of claim 1 further comprising organizing, by the orderer, the endorsed operation into a first block.

4. A method of claim 1, wherein the list is a space-efficient probabilistic data structure.

5. A method of claim 1, wherein the applying includes validating, by the orderer, the endorsed operation.

6. A method of claim 1, wherein the applying includes writing to the ledger.

7. A method of claim 1, wherein the applying includes recording an output on the ledger.

8. A method of claim 1, wherein the endorsed operation is endorsed by one or more peers.

9. A method comprising:
   receiving an endorsed operation for a blockchain network;
   preparing, for the endorsed operation, a set including a read portion and an output portion;
   committing, by an orderer according to the output portion of the set, the endorsed operation to a ledger of the blockchain network for a current block;
   including, based on the applying, a hash of the current block and a list comprising the endorsed operation in a subsequent block, wherein the endorsed operation is recorded in the list, and wherein the list states that the endorsed operation was validated in the current block without processing a query to determine that the endorsed operation was validated; and committing the subsequent block to the ledger of the blockchain network, wherein a client submitting a second operation that is the same as the endorsed operation receives the result of the endorsed operation without processing the second operation.

10. A method of claim 9, wherein the set includes a write portion.

11. A method of claim 10, further comprising:
committing the endorsed operation to a current state of the ledger according to the output portion.

12. A method of claim 9 further comprising:
checking, by the orderer, a validity of the endorsed operation using the read portion of the set, wherein the committing is further based on the validity of the endorsed operation.

13. A method of claim 9, wherein a state of the ledger is the same before and after committing the output portion of the set.

14. A system comprising:
a memory; and
a processor in communication with the memory, the processor being configured to perform functions comprising:
receiving, by an orderer, an endorsed operation for a blockchain network;
applying, by the orderer, the endorsed operation to a current block;
including, based on the applying, a hash of the current block and a list comprising the endorsed operation in a subsequent block, wherein the endorsed operation is recorded in the list, and wherein the list states that the endorsed operation was validated in the current block without processing a query to determine that the endorsed operation was validated; and
committing the subsequent block to a ledger of the blockchain network, wherein a client submitting a second operation that is the same as the endorsed operation receives the result of the endorsed operation without processing the second operation.

15. A system of claim 14 further comprising:
checking the endorsed operation against the list in the subsequent block to verify that the endorsed operation was applied.

16. A system of claim 14 further comprising organizing, by the orderer, the endorsed operation into a first block.

17. A system of claim 14, wherein the list is a space-efficient probabilistic data structure.

18. A system of claim 14, wherein the applying includes validating, by the orderer, the endorsed operation.

19. A system of claim 14, wherein the applying includes writing to the ledger.

20. A system of claim 14, wherein the applying includes recording an output on the ledger.

* * * * *